United States Patent
Bianchi

(10) Patent No.: US 7,067,940 B2
(45) Date of Patent: Jun. 27, 2006

(54) SUBMARINE BRANCHING UNIT HAVING ASYMMETRICAL ARCHITECTURE

(75) Inventor: Giuseppe Bianchi, Milan (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 410 days.

(21) Appl. No.: 10/321,611

(22) Filed: Dec. 18, 2002

(65) Prior Publication Data

US 2003/0218389 A1    Nov. 27, 2003

Related U.S. Application Data

(60) Provisional application No. 60/342,850, filed on Dec. 28, 2001.

(30) Foreign Application Priority Data

Dec. 19, 2001    (EP)    ................................... 01130187

(51) Int. Cl.
*H01H 45/00* (2006.01)
*H01H 45/14* (2006.01)
*H02H 7/00* (2006.01)

(52) U.S. Cl. ........................ 307/131; 307/69; 307/100; 361/63; 361/166; 361/191

(58) Field of Classification Search .................. 178/70, 178/74; 307/69, 100, 131; 340/850; 361/63, 361/166, 191; 379/296, 348
See application file for complete search history.

(56) References Cited

U.S. PATENT DOCUMENTS

| | | | |
|---|---|---|---|
| 4,798,969 A | 1/1989 | Inoue et al. | 307/112 |
| 5,196,984 A | 3/1993 | Webb | 361/191 |
| 5,214,312 A | 5/1993 | Inoue | 307/43 |
| 5,334,879 A | 8/1994 | Inoue et al. | 307/112 |
| 5,491,368 A | 2/1996 | Yamamoto | 307/113 |
| 5,517,383 A | 5/1996 | Webb | 361/191 |
| 5,644,466 A | 7/1997 | Ohta et al. | 361/191 |
| 5,790,358 A | 8/1998 | Kojima et al. | 361/63 |
| 5,841,205 A | 11/1998 | Webb | 307/130 |

FOREIGN PATENT DOCUMENTS

| EP | 0 780 994 A2 | 6/1997 |
|---|---|---|
| WO | WO 97/06610 | 2/1997 |

OTHER PUBLICATIONS

Nishikawa Hitoshi, "Feeding Path Changeover Circuit", Patent Abstracts of Japan of JP09233004, (Sep. 5, 1997).
Hino Osamu,"Feeder Connector", Patent Abstracts of Japan of JP 2001-230707, (Aug. 24, 2001).

Primary Examiner—Stephen W. Jackson
Assistant Examiner—Hal I. Kaplan
(74) Attorney, Agent, or Firm—Finnegan, Henderson, Farabow, Garrett & Dunner, L.L.P.

(57) ABSTRACT

A branching unit for use in submarine systems that includes a ground termination; first, second, and third cable terminations each coupled to a power feed line of a respective submarine cable; a re-configuration relay in series between the first cable termination and the ground termination, the re-configuration relay being unidirectional and having at least one contact positioned in series between the second and third terminations, the at least one contact being closed when the re-configuration relay is de-energized; and a bypass relay in series between the second and third cable terminations, the bypass relay having a contact positioned in parallel with the reconfiguration relay and being open when the bypass relay is de-energized.

14 Claims, 9 Drawing Sheets

SUBMARINE BRANCHING UNIT HAVING ASYMMETRICAL ARCHITECTURE

CROSS REFERENCE TO RELATED APPLICATIONS

This application claims the benefit of U.S. Provisional Application No. 60/342,850, filed Dec. 28, 2001, the content of which is incorporated herein by reference, and claims the right to priority based on European Application No. 01130187.6, filed Dec. 19, 2001, the content of which is incorporated herein by reference.

BACKGROUND OF THE INVENTION

The present invention relates to a submarine branching unit of an optical submarine cable communication system. More particularly, the present invention relates to a submarine branching unit having an asymmetrical architecture with a switching system designed to enhance the life of relay contacts by switching at zero current conditions.

Underwater or submarine cable systems were originally designed to provide a telecommunications link between two landing points separated by a body of water, such as between France and England. Optical fiber within the submarine cable could carry high bandwidth telecommunications across tens of kilometers without the need for amplification or regeneration.

As applications evolved that required transmission across larger distances, optical repeaters in the form of regenerators or amplifiers were required within the cable span, which mandated the availability of electrical power. Power feed lines and optical transmission lines were provided together in the submarine cables. These cable systems were soon improved to provide a telecommunications connection to three or more separate landing points by employing a branching unit at the junction of multiple cables under the body of water. A standard branching unit connected a main cable from one landing point and two spur cables from second and third landing points, respectively, in a Y-shaped arrangement.

FIG. 1 illustrates a typical three landing point connection scheme. Branching unit 100 physically interconnects the cables, coordinates the routing of the cables, and provides for power switching between the cables, among other things. Conventionally, stations at the landing points power repeaters 120 within the three cables in a two-sided and one-sided arrangement. In particular, the transmission of electrical direct current along a power feed line of the intervening cables is established between any two of the landing points, and the third landing point passes electrical current through its respective cable to a ground at sea earth. Relays within the branching unit establish the two-sided (bilateral) and one-sided (unilateral) feeding configuration and help to change it if a fault arises in one of the branches. More elaborate schemes also exist for connecting multiple landing points and multiple branching units in a submarine network.

The act of configuring a branching unit refers to coordinating the application of power from the respective landing points by providing a first power connection (two-sided) between two landing points and a second power connection (one-sided) between the third landing point and sea earth. The two-sided power connection between the above two landing points can be either a two-end feeding as shown in FIGS. 2A, 2B, i.e., a generator is present at each of the two landing points or, alternatively, a one-end feeding, i.e., a generator is present at one of the landing points and the cable is grounded at the other of the two landing points.

FIGS. 2A and 2B illustrate the two configuration steps. As shown in FIG. 2A, a low current is caused to flow from landing point B to landing point C via branching unit 10. In this arrangement, the line from B to C is nominated as the main trunk, and the spur branch to landing point A is left in an open-circuit condition. FIG. 2B shows that after the main trunk has been established, the one-sided powering of the spur takes place by shunting the spur to sea earth at the branching unit and feeding the spur from landing point A. For a branching unit, the two-sided power connection may be established between any two of the three landing points.

Various publications describe this configuration process for symmetrical branching units. U.S. Pat. No. 5,196,984 discloses a branching unit which employs electrical power feeding for repeaters and multiple branching units. The branching unit terminates three line cables and a sea earth and includes three high voltage element relays, only one of which is energized at a time. When electrical power is supplied between any two line cables, the third is isolated and connected to the sea earth. Short circuit or open circuit faults in one line cable may be isolated and connected to the sea earth, while allowing powering of the remaining two line cables that are free of faults.

Similarly, U.S. Pat. No. 5,214,312 discloses a power feed line switching circuit for a submarine branching unit having first, second and third electrical paths connected in a Y-shaped connection, and first, second and third terminals connected respectively thereto. The power feed line switching circuit also has first, second and third relays each including a drive unit inserted in the first, second and third terminals and a switching unit for disconnecting the corresponding terminal and connecting the terminal to the ground. The relays control the connections between the terminals and electrical paths for establishing a one-end power feed line or a two-end power feed line to maintain power feed for repeaters and the submarine branching unit by the plurality of relays.

U.S. Pat. No. 5,644,466 discloses a submarine cable branching system including a plurality of directional relays in respective power feed paths branched at a common node. Each of the directional relays is energized by a current flowing through the power feed path in a predetermined direction for energizing a corresponding switch provided in a different power feed path to establish a bilateral feed path and further a unilateral feed path. A bypassing switch is provided across one of the switches that forms the bilateral feed path such that the bypassing switch is urged to close in response to energization of a self-sustaining relay provided in the unilateral feed path.

Since the branching unit, repeaters and cables are laid underwater and are thus difficult to maintain, it is important that they have a high reliability to ensure uninterrupted telecommunications between the landing points. During power-up of the main trunk, however, the spur cable will acquire a charge related to the voltage drop at the branching unit and the length of the spur. Switching the spur cable to sea earth (typically the sea water) can cause a rapid discharge, which may damage contacts and relays with the branching unit. In particular, a relay that causes the spur cable to contact the sea earth is typically a high-voltage changeover relay. When actuation of the relay causes a make of the switch, an arc discharge will liberate a quantity of contact material. Acting as charge carriers, the liberated material may pass between the just opened contacts in the three-connection relay. An avalanche effect could take place that causes the main cable to discharge across the contact gap with large amperage, leading to imminent failure of the relay and connection of the main cable to sea earth. In this scenario, either it could be impossible to power the system up and configure the system or an oscillation could be initiated between the main trunk and spur (see, e.g., U.S. Pat. No. 5,517,383 at columns 1 and 6). Consequently, it is advantageous to avoid current arcing across the relay contacts.

U.S. Pat. Nos. 5,517,383 and 5,841,205 propose circuits to avoid this damage. In the '383 patent, an additional relay D and switch D1 are used to avoid dangerous arcing in the high voltage changeover relay such as C. Relay D is not a changeover relay and can withstand a greater amount of arcing without failing.

The '205 patent discloses the use of a two-stage relay to avoid damage from arcing. In this arrangement, the spur is disconnected from the main trunk when a defined current level is reached and then discharged by shorting its terminal station end (i.e., not underwater). After current in the main trunk ramps to a second level, the spur is connected to sea earth at the branching unit without arcing.

U.S. Pat. No. 4,798,969 discloses a branching unit circuit that includes an auxiliary relay that prevents the spur branch from re-connecting to the main trunk when its current falls to zero. A relay K1 in the main trunk controls the switch connecting the spur branch to sea earth. A latch-up relay K4 in the spur branch holds the spur branch out of contact with the main trunk if relay K1 opens and relay K4 remains energized.

U.S. Pat. No. 5,334,879 discloses a feeding system for a submarine cable communications system. The system includes a plurality of branching units provided on the communication cable and terminal stations each being connected through a repeater to one of the branching units. Each branching unit contains at least one switching circuit for switching to connect at least one of the repeaters to the communication cable or to ground depending on the current conducting through the feedline in the cable. The current thresholds of the switching circuits in the branching units are preferably different from each other.

U.S. Pat. No. 5,491,368 shows a power feed path switching circuit for coupling a first, second and third station in a normal state. The first unit senses a first current flowing in a first path connecting the first and second stations and disconnects a second path connecting the third station when the first current is sensed. A second unit senses a second current flowing in the first path and discharges, gradually, the second path. A third unit senses current flow in the first path and grounds the second path when the third current is sensed.

WO 97/06610 discloses a branching unit for an optical fiber system that is not symmetrical. The branching unit has first and second connections for coupling two sections of trunk cable and a third connection for an optical fiber spur cable. A switching system is provided responsive to a control voltage placed on the spur cable to apply an earth ground to the conductor of the trunk cable. This is used to maintain a current path in one trunk section when a failure or break occurs in the other trunk section.

U.S. Pat. No. 5,790,358 describes a feeding pass switching circuit. The switching circuit includes three terminals respectively connected to a feeding pass. The switching circuit is provided with a relay connected between a first terminal and a second terminal and activated by a current flowing in one direction. Another relay is connected between the second terminal and a third terminal and activated by a current flowing in either direction. One more relay is connected between the first terminal and the third terminal and activated by a current flowing in one direction.

Applicants have discovered that conventional circuits for power feed equipment in submarine branching units do not insure continued operation of good feed paths following the failure of a faulted feed path. Applicants have also discovered that conventional circuits do not provide adequate protection of relay contacts against possible arcing damage due to high current pulses as a consequence of cable discharge.

SUMMARY OF THE INVENTION

Applicants have discovered that an asymmetrical configuration for a submarine branching unit that uses bypass relays and directional relays can help to avoid the problem of arcing that can occur when relay contacts actuate under high current pulse conditions.

Applicants have developed a submarine branching unit that has one cable earthed in its initial, quiescent, configuration and that only needs to be reconfigured when the cable network must be changed as a consequence of a fault on one branch.

In one aspect, a branching unit for interconnecting power feed lines of three submarine cables consistent with the present invention includes first, second, and third cable terminations each coupled to a power feed line of a respective submarine cable, and a ground termination. A re-configuration relay is positioned in series between the first cable termination and the ground termination. The re-configuration relay is unidirectional and has at least one contact positioned in series between the second and third terminations. The at least one contact is closed when the reconfiguration relay is de-energized. Also, a bypass relay is positioned in series between the second and third cable terminations. The bypass relay has a contact positioned in parallel with the re-configuration relay and is open when the bypass relay is de-energized.

Preferably, configuration of the branching unit may occur first by the flow of a trunk current between the second and third cable terminations until the contact of the bypass relay closes and then by the flow of a spur current between the first cable termination and the ground termination. The branching unit may further comprise a ground-breaking relay and a grounding relay positioned in a re-configuration path electrically connected to an end of the re-configuration relay opposite the first cable termination. Preferably, at least one contact of the re-configuration relay connects one of the second and third cable terminations to the re-configuration path when the re-configuration relay is energized. A contact of the ground-breaking relay disconnects both the re-configuration relay and the ground-breaking relay from the ground termination when the ground-breaking relay is energized. A contact of the grounding relay connects the other of the second and third cable terminations to the ground termination via a grounding path when the grounding relay is energized.

Also, configuration of the branching unit may occur first by flow of a spur current between the first cable termination and the ground termination until the at least one contact of the re-configuration relay opens, then by flow of a trunk current between the one of the second and third cable terminations and the ground termination via the re-configuration path, and then by energizing the ground-breaking and grounding relays.

Preferably, a latching relay is positioned in an electrical path of the contact of the bypass relay. The latching relay has a contact in parallel with the contact of the bypass relay. First and second grounding-path relays may also be positioned within the grounding path and configured to provide redundant connection of the one of the second and third cable terminations to the ground termination.

In another aspect, a branching unit for interconnecting power feed lines of three submarine cables consistent with the present invention has a quiescent state where a first submarine cable is initially coupled to ground as a spur cable and second and third submarine cables are initially coupled together as a main trunk. The branching unit includes a first cable termination coupled to the first submarine cable, a second cable termination coupled to the second submarine cable, and a third cable termination coupled to the third submarine cable. A re-configuration relay, which is a unidirectional device, is configured to create an electrical path between the first cable termination and one of the second and third cable terminations to form the main trunk when the re-configuration relay becomes energized. A ground-breaking relay is positioned in the electrical path and is configured to isolate the electrical path from ground when the ground-breaking relay becomes energized. Finally, the branching unit includes a grounding relay positioned in the electrical path and configured to connect the other of the second and third cable terminations to ground as the spur cable when the grounding relay becomes energized.

Preferably, the re-configuration relay and the grounding relay are configured to electrically connect the second and third cable terminations to form the main trunk when the re-configuration relay and grounding relays are de-energized. The re-configuration relay, ground-breaking relay, and grounding relay are configured to become energized substantially in the absence of current flow across contacts of the respective relays.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute a part of this specification, illustrate embodiments of the invention and, together with the description, serve to explain the advantages and principles of the invention.

DETAILED DESCRIPTION OF THE PREFERRED EMBODIMENTS

Figure 1:
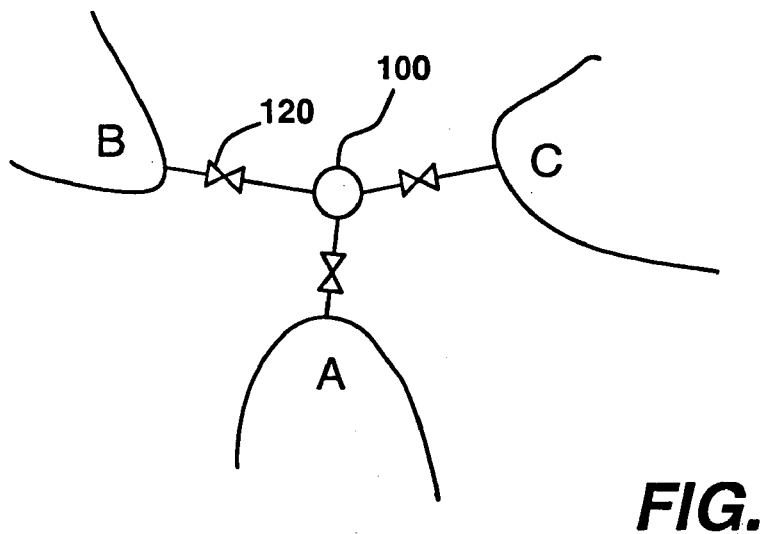
FIG. 1 is an illustration of a branching unit implemented in a submarine telecommunications system having three landing points.
Figure 2A:
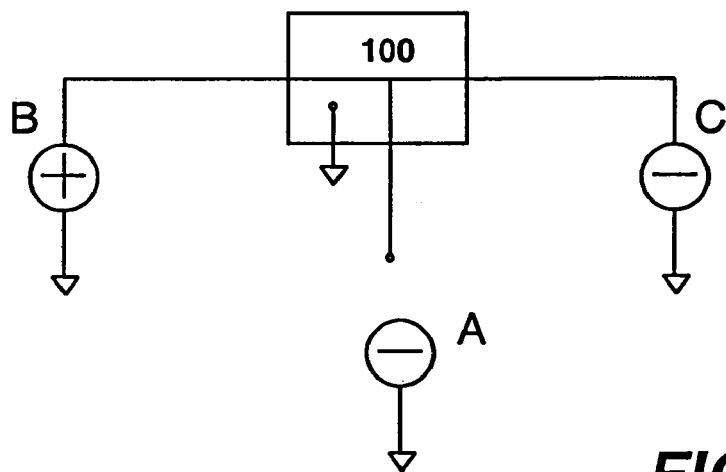
FIG. 2A is a schematic diagram of a branching unit implemented in a submarine telecommunications system after the first step of configuration.
Figure 2B:
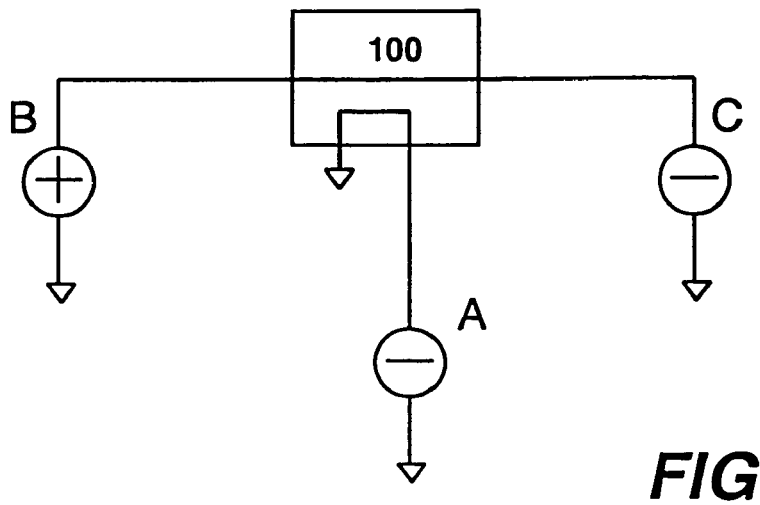
FIG. 2B is a schematic diagram of a branching unit implemented in a submarine telecommunications system after the second step of configuration.

Reference will now be made to various embodiments according to this invention, examples of which are shown in the accompanying drawings and will be obvious from the description of the invention. In the drawings, the same reference numbers represent the same or similar elements in the different drawings whenever possible.

Figure 3:
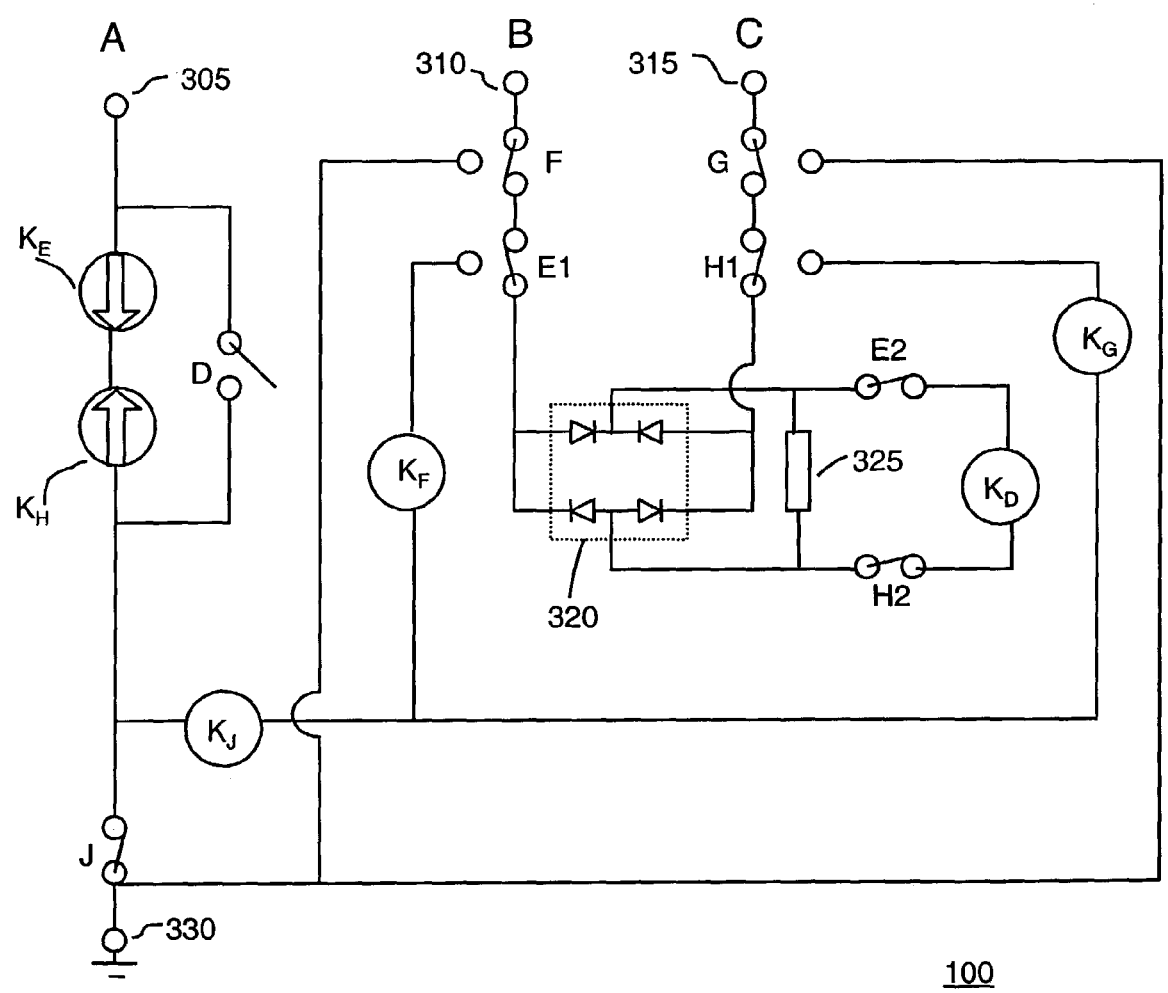
FIG. 3 is a schematic diagram of a branching unit, in the quiescent state, implemented consistent with a first embodiment of the present invention.

In accordance with the present invention, and as generally referred to as 100 in FIG. 3, a branching unit consistent with the principles of the present invention includes first, second, and third cable terminations each coupled to a power feed line of a respective submarine cable, a ground termination, and first, second, and third high-voltage relays.

As embodied in FIG. 3, branching unit 100 in FIG. 3 has three terminations or terminals 305, 310, and 315 that represent connections to respective landing points A, B, and C of FIG. 1. For sake of discussion, these cables attached to terminals 305, 310, and 315 are called cables A, B, and C, respectively. As will be understood, branching unit 100 is typically submerged in a large body of water like a sea or ocean, and submarine cables (not shown) travel from terminals 305, 310, and 315 to the landing points across distances. Naturally, each of the submarine cables may connect with other branching units before reaching its landing point.

The submarine cables include both optical transmission fiber and power feed lines. FIG. 3 illustrates only the circuitry in branching unit 100 that corresponds to the electrical power and switching aspects of that device and not the routing or maintenance of the optical communication system.

Branching unit 100 is asymmetrical. In other words, its layout is such that each of the terminals 305, 310, and 315 is not electrically equivalent to each of the others and powering of the branching unit is dependent on the arrangement of terminals 305, 310, and 315. FIG. 3 illustrates the original configuration for branching unit 100. In the asymmetrical design of the present invention, the branching unit does not need to undergo a configuration process that requires internal switching of relays, which helps to preserve the integrity of those devices. Instead, switching of the relays is reserved for instances when the branching unit must be changed from its original configuration, typically due to a failure that occurs on one of the submarine cables. In the quiescent state shown in FIG. 3, the submarine cable A attached to terminal 305 (from landing station A) is grounded, i.e. set up as a spur cable, while the cables B and C attached to terminals 310 and 315 (from landing stations B and C) are connected together via branching unit 100, i.e. set up as a main trunk.

Branching unit 100 according to the first embodiment of the present invention includes circuitry with relays $K_D$, $K_E$, $K_F$, $K_G$, $K_H$, and $K_J$, whose coils are depicted in FIG. 3 as circles. The contacts of the relays are designated with corresponding letters. For instance, contact D in FIG. 3 is controlled by the coil of relay $K_D$. Likewise, contacts E1 and E2 are both controlled by the coil of relay $K_E$. Shown in its quiescent state, branching unit 100 of FIG. 3 is illustrated with all relay contacts in their "normal" state, i.e., the state where the contact lies when its relay is de-energized.

Each relay has a threshold pull-in current above which a magnetic field will be produced in its coil sufficient to energize the relay and to cause the contact to switch position. In addition, all relays shown in the diagram are non-latching relays, meaning that the contacts return to their original position when the coil changes from an energized to a de-energized state. The change from an energized state to a de-energized state occurs when the current flowing through the relay's coil drops below a threshold drop-out current, which is less than the relay's pull-in current level. Those relays drawn with an arrow inside the circle are unidirectional relays whose coils only become energized when the current flows in the direction of the arrow.

A by-pass element may be associated with one or more of the relays to bypass from the relay coil all or part of the current in excess of the relay pull-in current. The by-pass element can be, for example, one or a series of more than one Zener diodes (depending on the voltage, power and current of each specific relay) in parallel with the relay coil. For bi-directional relays a diode bridge or an arrangement of Zener diodes, connected in a back-to-back configuration, can be used to maintain bi-directionality for the relay coil.

Branching unit 100 also has a diode bridge 320 positioned in the electrical path between terminals 310 and 315. Diode bridge 320 in combination with Zener diodes or another power supply unit (not shown) can be used to feed power to electrical equipment located within the branching unit, e.g., associated optical amplifiers 325. The Zener diodes or power supply unit also offer surge protection to the electrical equipment. In addition, diode bridge 320 helps to ensure that after relay $K_D$ becomes energized it does not become de-energized if a short circuit in a submarine cable attached to terminals 310 or 315 causes a sudden reversal in current direction. A circuit arrangement other than the diode bridge shown in FIG. 3 may be used to effect the same result.

Figure 4:
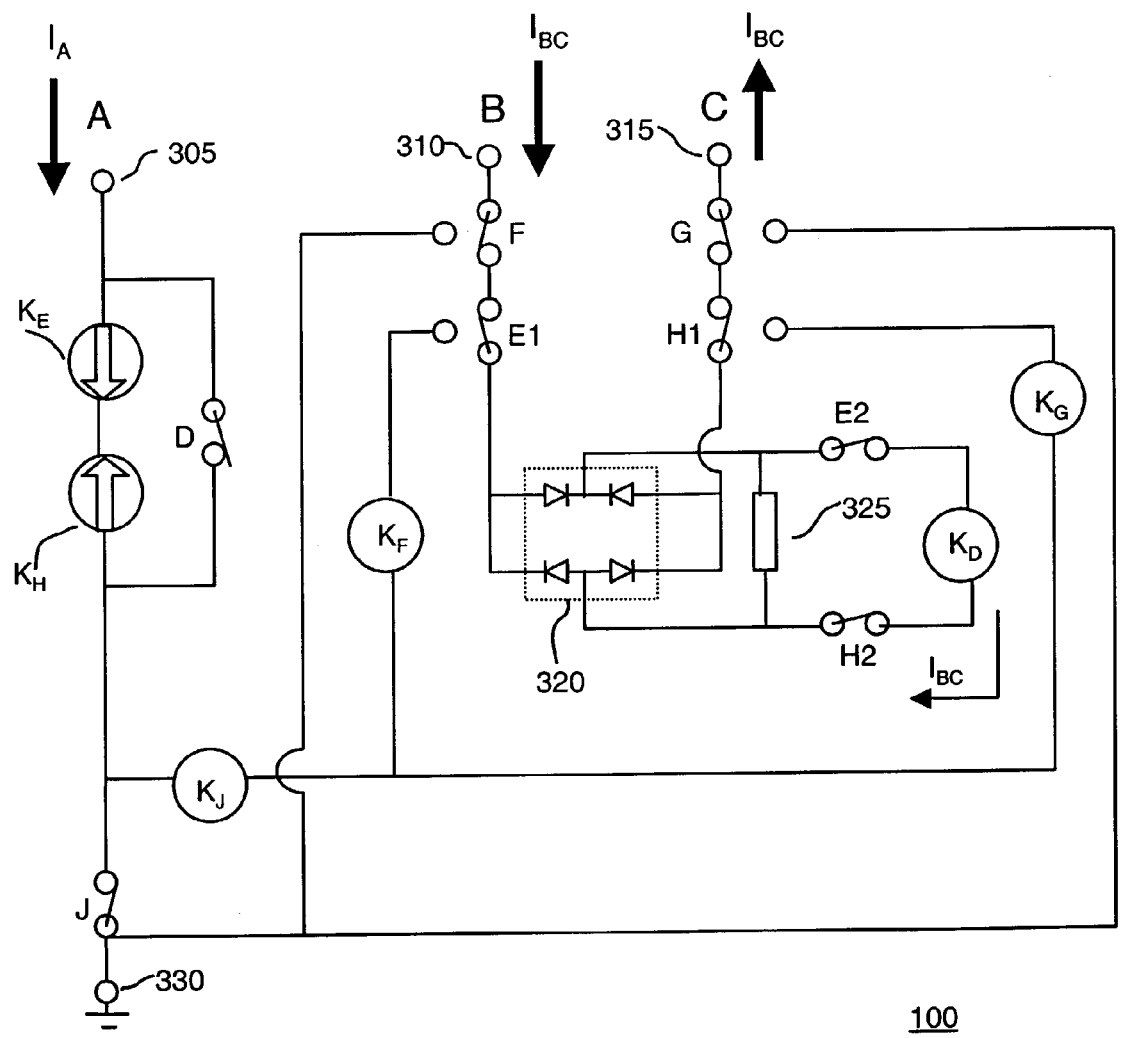
FIG. 4 is a schematic diagram of the branching unit consistent with the first embodiment of the present invention operating in an original configuration.

The following describes how current may be fed through branching unit 100 without a change from its original configuration. In a first step, current $I_{BC}$ is caused to flow along the main trunk between terminals 310 and 315, e.g. between landing points B and C or vice versa. In passing between terminals 310 and 315, current $I_{BC}$ flows through bypass relay $K_D$, causing contact D to close from its normally open position. The closing of contact D provides a current path from terminal 305 (landing point A) around directional relays $K_E$ and $K_H$, which are positioned opposing each other, to sea earth (typically the sea water), as shown in FIG. 4. Thereafter, current $I_A$ may be caused to flow along the spur branch between landing point A (terminal 305) and sea earth at terminal 330. In this sequence, only contact D is forced to close in the process of establishing full operation of branching unit 100, and the closing of contact D occurs with no current flowing through it. Consequently, possible damage to contact D due to arcing (that could have occurred in case of high current pulses) is avoided. As well, current $I_{BC}$ in the main trunk between terminals 310 and 315 will be maintained independently of current $I_A$ in the spur cable between terminals 305 and 330, i.e., the main trunk is not affected by a possible fault in the spur cable.

To power-down branching unit 100 during its operation in the original configuration of FIG. 4, the grounded spur cable attached to terminal 305 is powered down first. Then, the main trunk cable is powered down, which ensures that the switching of contact D occurs without current flowing through it. Branching unit 100 at that point returns to the condition depicted in FIG. 3.

A change from the original configuration of branching unit 100 may be made, for example, to accommodate a fault in one of the cables making up the main trunk. If a fault occurs in cable C between terminal 315 and landing point C, for instance, the branching unit may be re-configured to connect the cables at terminals 305 and 310 (cables A and B) as the main trunk. Alternatively, if a fault occurs in the cable between terminal 310 and landing point B, the branching unit may be re-configured to connect the cables at terminals 305 (cable A) and 315 (cable C) as the main trunk.

Figure 5:
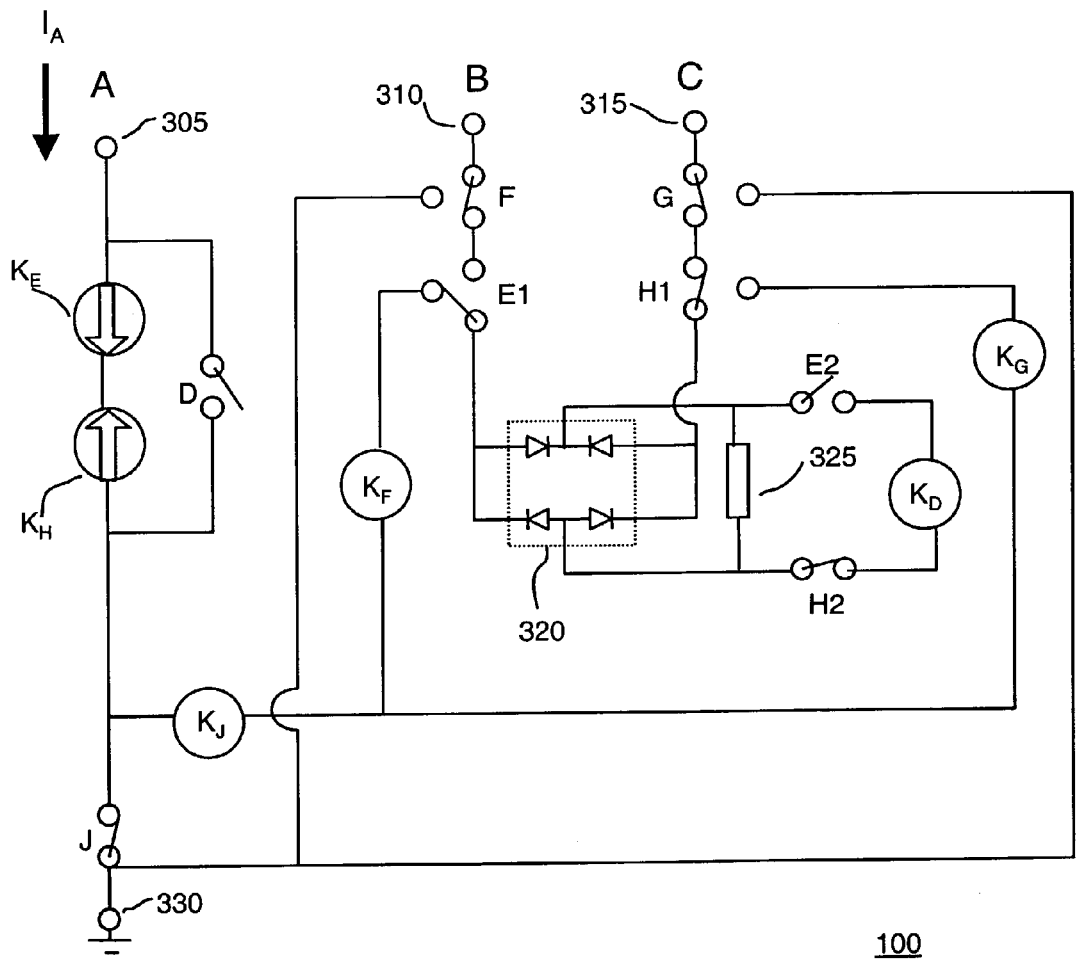
FIG. 5 is a schematic diagram of the branching unit consistent with the first embodiment of the present invention operating in the first stage of being reconfigured.

The original configuration of branching unit 100 may be changed by first causing current $I_A$ to flow in the spur branch affiliated with terminal 305 rather than current $I_{BC}$ in the main trunk. If the cable at terminal 305 is to be connected with the cable at terminal 315 to form a new main trunk and the cable at terminal 310 is to form a spur cable to sea earth, then current $I_A$ is first caused to flow from terminal 305 to sea earth via terminal 330. FIG. 5 shows that as current $I_A$ flows from terminal 305 to terminal 330, re-configuration relay $K_E$ will become energized, causing the cables at terminals 310 and 315 to be separated by activating contacts E1 and E2. Contact E1 switches to a path to sea earth via a path through relays $K_F$ and $K_J$, and contact E2 switches to an open position. The switching of contacts E1 and E2 occurs when no current is flowing in the main trunk to avoid any damage that may ensue from high current pulses and potential consequent arc discharge at the contact. As well, diode bridge 320 remains in series with the powered line.

Figure 6:
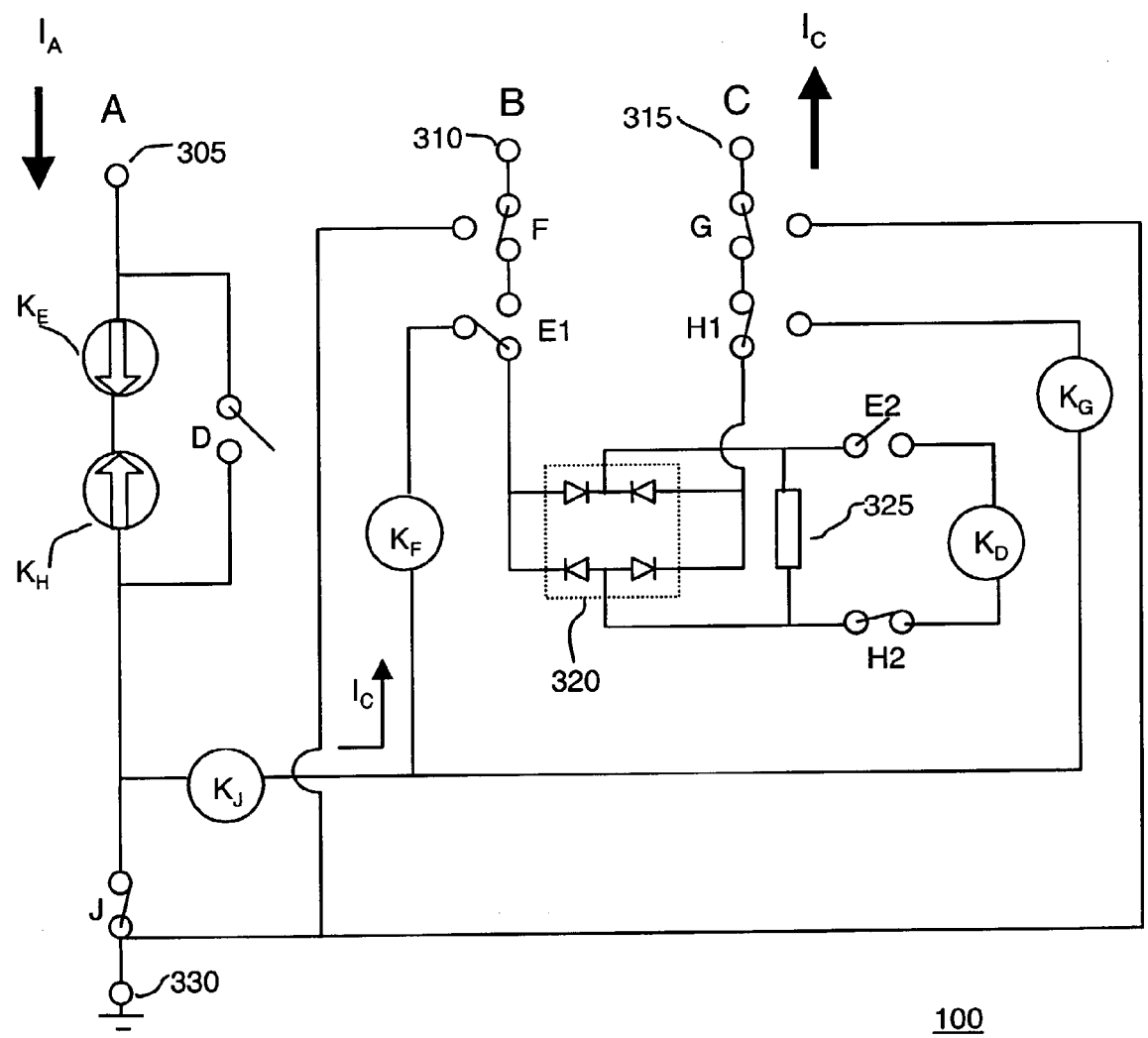
FIG. 6 is a schematic diagram of the branching unit consistent with the first embodiment of the present invention operating in the second stage of being reconfigured.
Figure 7:
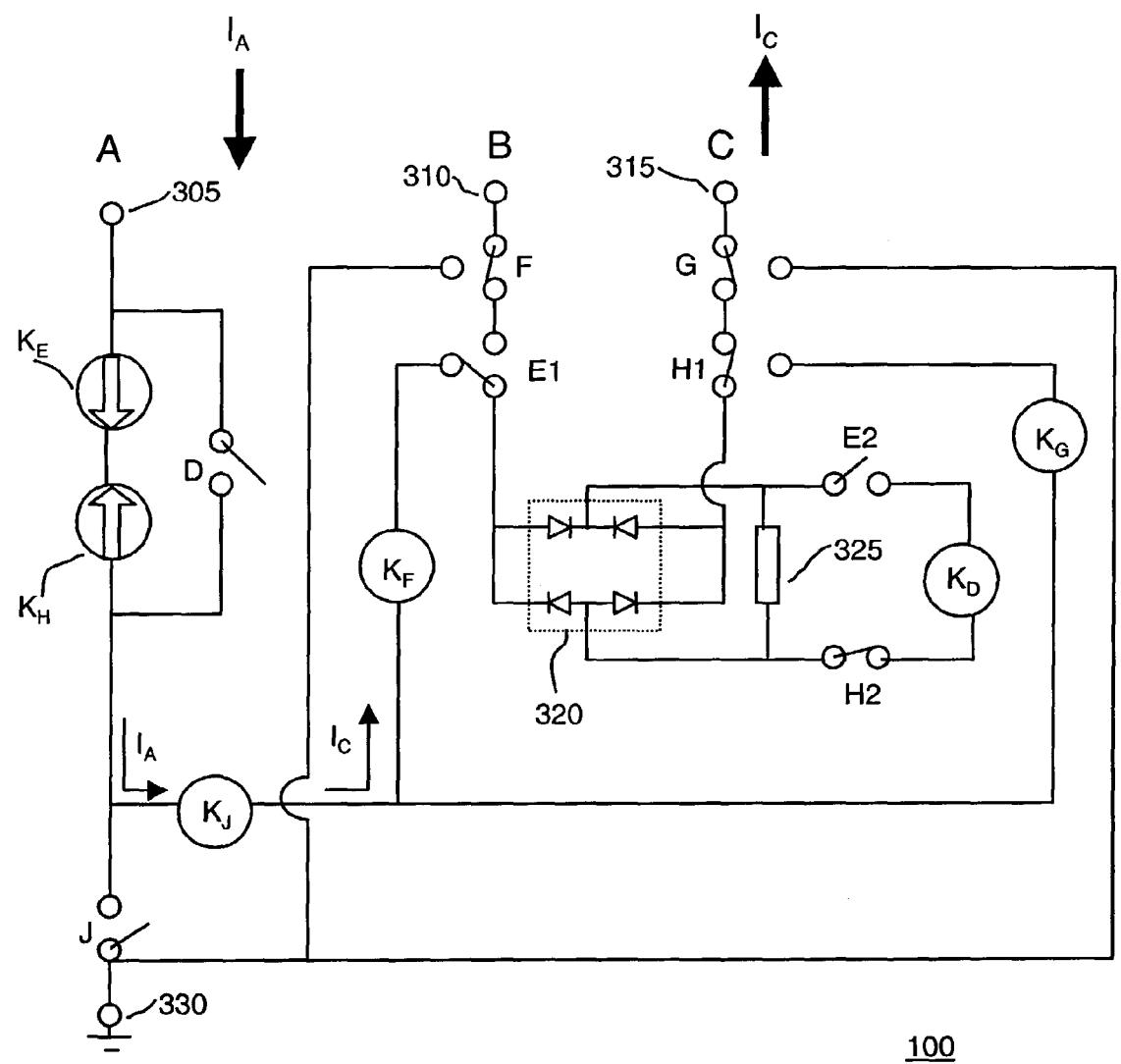
FIG. 7 is a schematic diagram of the branching unit consistent with the first embodiment of the present invention operating in the third stage of being reconfigured.

Following the switching of contacts E1 and E2, a current $I_C$ is provided from terminal 315 to landing station C (directly connected or indirectly connected through one or more intermediate branching unit), as shown in FIG. 6. Gradually, current $I_C$ is increased up to the magnitude of the current $I_A$. After or about the point at which $I_C=I_A$, both currents are increased together. When the current $I_C$ (and therefore current $I_A$) exceeds the threshold pull-in current for ground-breaking relay $K_J$, (which is higher than the pull-in current for reconfiguration relays $K_E$ and $K_H$) that relay will become energized and cause contact J to open, which breaks the contact from terminal 330 and ground, as shown in FIG. 7. Because the currents $I_C$ and $I_A$ are equal to each other when $I_C$ exceeds the threshold pull-in current for relay $K_J$, the current flowing through contact J when it opens will be zero, avoiding any damaging arc. At this point, the cables from terminals 305 and 315 (between landing points A and C) are the main trunk for branching unit 100.

Thereafter, the voltages of the power feeding equipment at landing points A and C can be adjusted to further increase the current $I_C$ ($=I_A$). When the current $I_C$ exceeds the threshold pull-in current for grounding relay $K_F$ (which is higher than the pull-in current for ground-breaking relay $K_J$), that relay will become energized, causing contact F to switch (not shown) to a direct path to ground. As with other contact switching in the present invention, contact F switches when no current is flowing through it if cable B attached to terminal 310 is either isolated or grounded at its opposite end. After contact F switches to ground, the cable attached to terminal 310 (landing station B) can be powered or not according to system requirements as a spur cable.

To power-down branching unit 100 from the configuration shown in FIG. 7 after contact F has been closed, the grounded spur cable B connected to terminal 310 is powered down first. Then, current $I_C$ $(=I_A)$ is decreased until it falls below the threshold drop-out current of relay $K_F$, which isolates the spur cable at terminal 310 from ground. While decreasing the value of currents $I_A$ and $I_C$ the voltages of the landing stations A and C are adjusted so that the voltage, at the point where the branching unit is located, is zero (this condition is the same which occurs during the reconfiguration phase of the branching unit). In this way, when the threshold drop-out current of relay $K_J$ is reached and contact J closes, dangerous arc discharge is avoided. After this closure, the cable connected to terminal 315 should be powered down, followed by the cable connected to terminal 305.

Switching in the branching unit occurs in a similar manner if the branching unit is to be changed from its original configuration so that cable A at terminal 305 is connected with cable B at terminal 310 to form a new main trunk (between landing points A and B) and the cable at terminal 315 (landing point C) is connected to form a spur cable to sea earth. For this change, current $I_A$ is first caused to flow in a direction from sea earth to terminal 305 (opposite that shown in FIGS. 4–7) in the original configuration of the branching unit. As this flow occurs, direction relay $K_H$ will become energized, causing the cables at terminals 310 and 315 to be separated by activating contacts H1 and H2. Contact H1 switches to sea earth via a path through relays $K_G$ and $K_J$, and contact H2 switches to an open position. Like the switching of contacts E1 and E2, the switching of contacts H1 and H2 occurs with no current flowing through them.

Following the switching of contacts H1 and H2, a current $I_B$ (not shown) is caused to flow into terminal 310 (from landing point B). Gradually, current $I_B$ is increased up to the magnitude of the current $I_A$. After or about the point at which $I_B=I_A$, both currents are increased together. When the current $I_B$ (and therefore current $I_A$) exceeds the threshold pull-in current for relay $K_J$, that relay will become energized and cause contact J to open, which breaks the contact from terminal 330 and ground. Because the currents $I_B$ and $I_A$ are equal to each other when $I_B$ exceeds the threshold pull-in current for relay $K_J$, the current flowing through contact J when it opens will be zero, avoiding any damaging arc. At this point, the cables from terminals 305 and 310 (between landing points A and B) are the main trunk for branching unit 100.

Thereafter, the voltages of the power feeding equipment at landing points A and B can be adjusted to further increase the current $I_B$ $(=I_A)$. When the current $I_B$ exceeds the threshold pull-in current for relay $K_G$ (which is higher than the pull-in current for ground-breaking relay $K_J$), that relay will become energized, causing contact G to switch to a direct path to ground. As with other contact switching in the present invention, contact G switches when no current is flowing through it because cable C attached to terminal 315 is either isolated or grounded. After contact G switches to ground, cable C attached to terminal 315 can be powered or not according to system requirements as a spur cable.

To power-down branching unit 100 from the configuration where cables between landing stations A and B form the main trunk, the grounded spur cable connected to terminal 315 is powered down first. Then, currents $I_A$ and $I_B$ are both decreased until they fall below the threshold drop-out current for relay $K_G$, which causes contact G to again isolate terminal 315 from ground. While decreasing the value of currents $I_A$ and $I_B$ the voltages of the landing stations A and B are adjusted so that the voltage, at the point where the branching unit is located, is zero (this condition is the same which occurs during the reconfiguration phase of the branching unit). In this way, when the threshold drop-out current of relay $K_J$ is reached and contact J closes, dangerous arc discharge is avoided. After this closure, cable B connected to terminal 310 should be powered down, followed by cable A connected to terminal 305.

In a second embodiment of the present invention, additional relays and contacts are included to protect the contacts of branching unit 100 from faults, either short circuits or open circuits. This alternative embodiment minimizes the potential for damage to relay contacts that may occur if the contacts are not firmly closed and high currents pass through them when a fault exists on the line.

Figure 8:
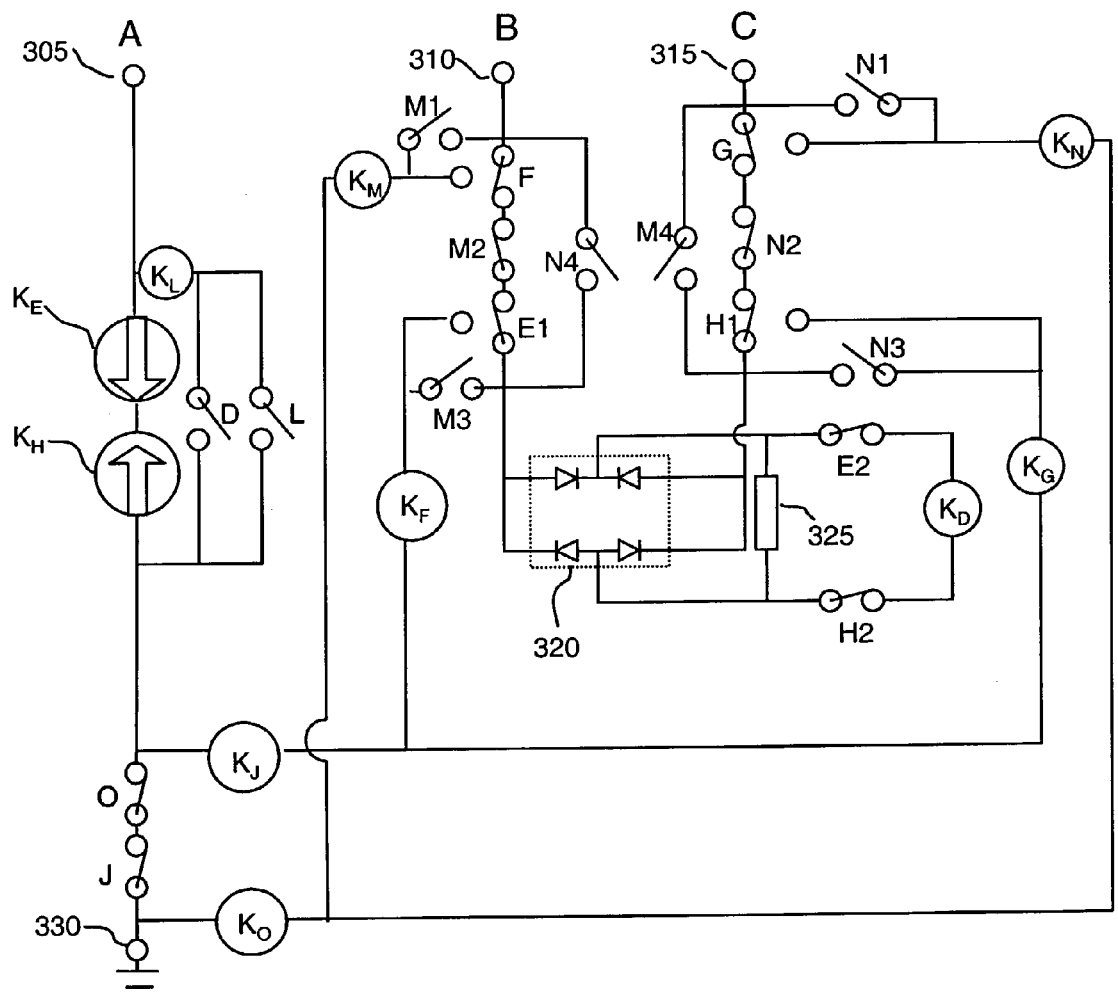
FIG. 8 is a schematic diagram of a branching unit consistent with a second embodiment of the present invention.
Figure 9:
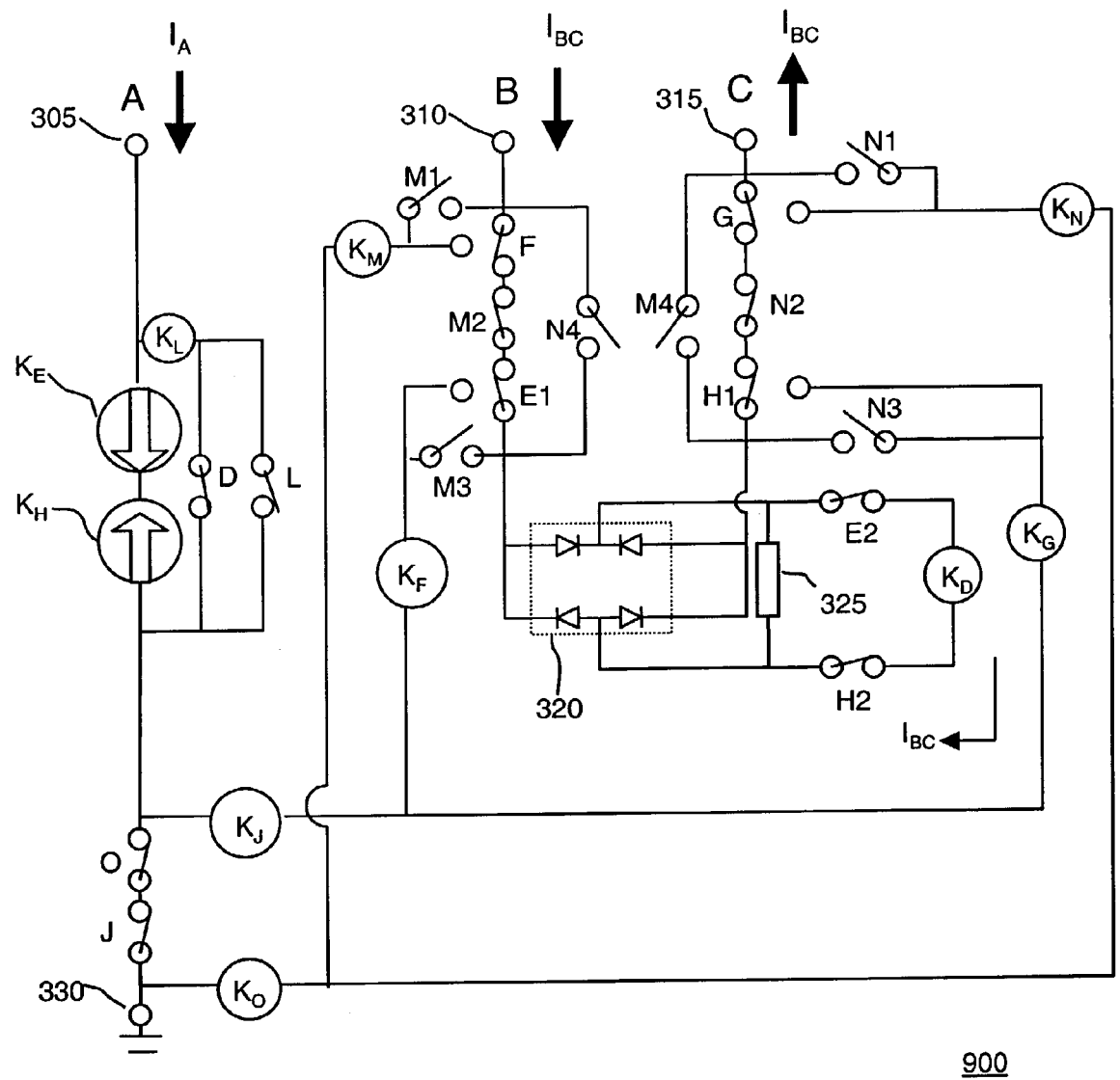
FIG. 9 is a schematic diagram of the branching unit consistent with the second embodiment of the present invention operating in an original configuration.

FIG. 8 is a schematic diagram of the second embodiment of the present invention showing a branching unit 900 that includes fault protection. Branching unit 900 of FIG. 8 adds relays $K_L$, $K_M$, $K_N$, and $K_O$ and affiliated switches L, M1–M4, N1–N4, and O to the configuration of branching unit 100 of FIGS. 3–7. For the main trunk in the original configuration, which is formed of the cables attached to terminals 310 and 315, the additional switches M2 and N2 are naturally in a closed position so that a current such as $I_{BC}$ can be established between landing points B and C. When relay $K_D$ becomes energized from current $I_{BC}$, it closes contact D, which is normally open. After a current $I_A$ is established in the spur cable attached to terminal 305, additional relay $K_L$ will become energized and close latch-up contact L, as shown in FIG. 9. Contact L helps to protect contact D from damage if its contact is not firmly closed. If a fault occurs on the main trunk, it has no influence on the spur cable because contact L remains closed as long as sufficient current passes through relay $K_L$, even if contact D opens. Moreover, if a fault occurs in the spur cable, it has no effect on the main trunk since contact D is firmly closed.

Figure 10:
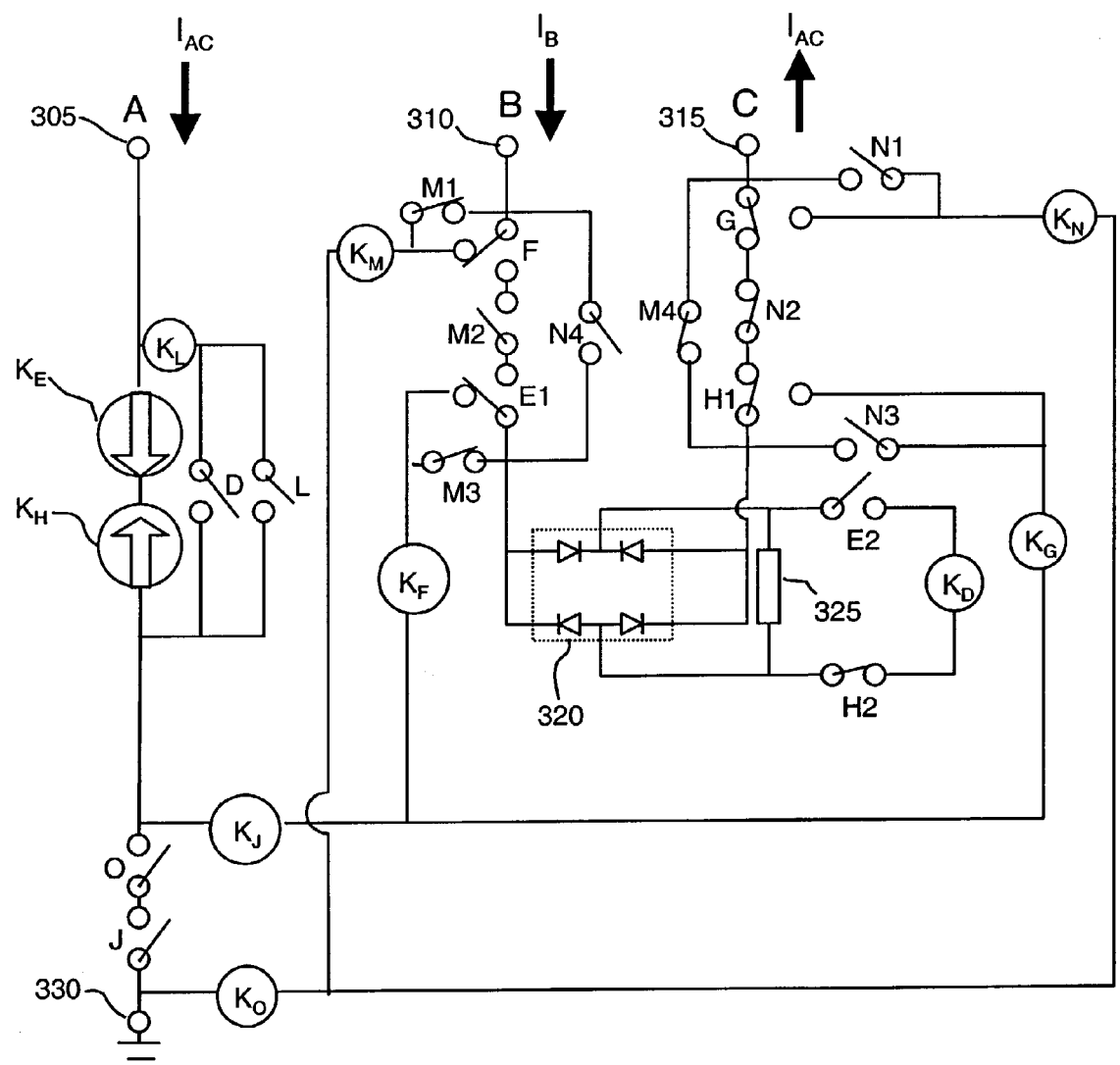
FIG. 10 is a schematic diagram of the branching unit consistent with the second embodiment of the present invention in a re-configured state.

FIG. 10 illustrates a schematic diagram of branching unit 900 according to the second embodiment of the present invention if the original configuration is changed so that cables A and C form the main trunk and cable B is the spur cable. Reconfiguration of branching unit 900 occurs in the same manner as described above for branching unit 100.

In this reconfigured state, when the spur cable is powered by current $I_B$, the relay $K_M$, is powered: contacts M1, M3 and M4 (normally open) close; M2 opens. Likewise, when $K_O$ is powered, contact O opens. If a fault occurs on the spur cable B the fall of current through relay $K_O$ and relay $K_M$ does not affect the main trunk: furthermore, contacts O, M1–M4 are not subjected to dangerous discharges.

If a fault occurs on the main trunk, while the spur cable is not affected by the fault, the following phenomena take place:

a) the fall of current of relay $K_E$, causes the switch of contact E1. The contacts M2 and M3, which respectively isolate the main trunk from the spur branch and maintain the electrical continuity of the main trunk, protect contact E1;

b) the drop of current through $K_F$ causes contact F to switch. Contacts M2 and M1, which respectively isolate the main trunk from the spur branch and maintain the electrical continuity of the spur branch, protect contact F;

c) the drop of current through $K_J$ makes the contact J close. The relay $K_O$, powered by the current of the spur branch, maintains its contact O open, thus avoiding dangerous discharges to earth through contact J.

Furthermore, if we also consider the possibility of a transient reversal of the current above the pull-in current of relay $K_H$, contact H1 could open: the dangerous effects on its contacts are prevented by M4 which maintains the electrical continuity of the main trunk.

When the main trunk is configured between A and B while the spur branch is connected to C, relays $K_N$ and $K_O$ (see FIG. 10) behave in a symmetrical way to what said above for relays $K_M$ and $K_O$.

Accordingly, the present invention provides a branching unit for submarine cables that enables the switching of relay contacts at times when no current is flowing through the contacts. Moreover, the branching unit is arranged such that a fault on either the main trunk or the spur cable will not affect operation of the other. Although not symmetrical, the branching unit may be re-configured with a simple sequence on power-up so that the main trunk is between any two of the unit's terminals.

It will be apparent to those skilled in the art that various modifications and variations can be made in the disclosed process and product without departing from the scope or spirit of the invention. For example, alternate relay placement may yield similar logical results. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A branching unit for interconnecting power feed lines of three submarine cables, comprising:
    a ground termination;
    first, second, and third cable terminations each coupled to a power feed line of a respective submarine cable;
    a re-configuration relay in series between the first cable termination and the ground termination, the re-configuration relay being unidirectional and having at least one contact positioned in series between the second and third terminations, the at least one contact being closed when the re-configuration relay is de-energized; and
    a bypass relay in series between the second and third cable terminations, the bypass relay having a contact positioned in parallel with the reconfiguration relay and being open when the bypass relay is de-energized.

2. The branching unit of claim 1, wherein configuration of the branching unit occurs first by the flow of a trunk current between the second and third cable terminations until the contact of the bypass relay closes and then by the flow of a spur current between the first cable termination and the ground termination.

3. The branching unit of claim 1, further comprising a ground-breaking relay and a grounding relay positioned in a re-configuration path electrically connected to an end of the re-configuration relay opposite the first cable termination.

4. The branching unit of claim 3, wherein the at least one contact of the reconfiguration relay connects one of the second and third cable terminations to the reconfiguration path when the re-configuration relay is energized.

5. The branching unit of claim 4, wherein a contact of the ground-breaking relay disconnects both the re-configuration relay and the ground-breaking relay from the ground termination when the ground-breaking relay is energized.

6. The branching unit of claim 5, wherein a contact of the grounding relay connects the other of the second and third cable terminations to the ground termination via a grounding path when the grounding relay is energized.

7. The branching unit of claim 6, wherein configuration of the branching unit occurs first by flow of a spur current between the first cable termination and the ground termination until the at least one contact of the re-configuration relay opens, then by flow of a trunk current between the one of the second and third cable terminations and the ground termination via the re-configuration path, and then by energizing the ground-breaking and grounding relays.

8. The branching unit of claim 3, further comprising a latching relay positioned in an electrical path of the contact of the bypass relay, the latching relay having a contact in parallel with the contact of the bypass relay.

9. The branching unit of claim 8, further comprising first and second grounding-path relays positioned within the grounding path and configured to provide redundant connection of the one of the second and third cable terminations to the ground termination.

10. A branching unit for interconnecting power feed lines of three submarine cables, the branching unit having a quiescent state wherein a first submarine cable is initially coupled to ground as a spur cable and second and third submarine cables are initially coupled together as a main trunk, comprising:
    a first cable termination coupled to the first submarine cable;
    a second cable termination coupled to the second submarine cable;
    a third cable termination coupled to the third submarine cable;
    a re-configuration relay configured to create an electrical path between the first cable termination and one of the second and third cable terminations to form the main trunk when the re-configuration relay becomes energized, the re-configuration relay being unidirectional;
    a ground-breaking relay positioned in the electrical path and configured to isolate the electrical path from ground when the ground-breaking relay becomes energized; and
    a grounding relay positioned in the electrical path and configured to connect the other of the second and third cable terminations to ground as the spur cable when the grounding relay becomes energized.

11. The branching unit of claim 10, wherein the re-configuration relay and the grounding relay are configured to electrically connect the second and third cable terminations to form the main trunk when the re-configuration relay and grounding relays are de-energized.

12. The branching unit of claim 11, wherein the ground-breaking relay becomes energized at a lower current level than the grounding relay.

13. The branching unit of claim 11, wherein the re-configuration relay, ground-breaking relay, and grounding relay are configured to become energized substantially in the absence of current flow across contacts of the respective relays.

14. Optical submarine telecommunication system including at least three cables, a submarine branching unit according to any one of claims 1–13 and at least two power generators to feed electrical power to the submarine branching unit.

* * * * *